US009836496B1

(12) United States Patent
Liu et al.

(10) Patent No.: US 9,836,496 B1
(45) Date of Patent: Dec. 5, 2017

(54) MULTI-PLATFORM ALERTING SYSTEM

(71) Applicant: Palantir Technologies Inc., Palo Alto, CA (US)

(72) Inventors: Jeremy Liu, Arlington, VA (US); Timothy Wilson, Palo Alto, CA (US); Mitchell Beard, Falls Church, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/385,659

(22) Filed: Dec. 20, 2016

(51) Int. Cl.
*G06F 21/00* (2013.01)
*G06F 17/30* (2006.01)
*H04L 29/06* (2006.01)

(52) U.S. Cl.
CPC .. *G06F 17/30368* (2013.01); *G06F 17/30864* (2013.01); *H04L 63/101* (2013.01)

(58) Field of Classification Search
USPC .......................................................... 726/4
See application file for complete search history.

(56) References Cited

U.S. PATENT DOCUMENTS

| 2003/0065613 A1* | 4/2003 | Smith | G06Q 40/025 705/38 |
| 2003/0195868 A1* | 10/2003 | Wilson | G06Q 40/02 |
| 2004/0260702 A1* | 12/2004 | Cragun | G06F 17/30873 |

* cited by examiner

*Primary Examiner* — William Goodchild
(74) *Attorney, Agent, or Firm* — Schwegman Lundberg & Woessner, P.A.

(57) ABSTRACT

Example embodiments relate to a notification system. The notification system accesses a set of components of a first data object, a user having registered to monitor the first data object for modifications. The notification system compares the set of components of the first data object to a previous set of components of the first data object and determines, based on the comparison, that the set of components of the first data object includes at least one modification from the previous set of components of the first data object. In response to determining that the set of components of the first data object includes at least one modification from the previous set of components of the first data object, the notification system notifies the user of the at least one modification to the first data object.

20 Claims, 6 Drawing Sheets

MULTI-PLATFORM ALERTING SYSTEM

TECHNICAL FIELD

The present disclosure generally relates to the technical field of special-purpose machines that facilitate the curation and management of data sets, including computerized variants of such special-purpose machines and improvements to such variants, and to the technologies by which such special-purpose machines become improved compared to other special-purpose machines that facilitate the curation and management of data sets. In particular, the present disclosure addresses systems and methods for the providing alerts associated with the data sets.

BACKGROUND

Computer-based data systems provide users with access to large data sets. For example, a data system can fulfill user requests for specified data, and cause presentation of the specified data to the user. While these types of computer-based data systems allow users to request and access data, they also require that a user repeatedly access a specified piece of data to determine whether modifications to the specified piece of data have occurred. This can be impractical when a user desires immediate notification that data has been modified and/or the user needs to monitor multiple pieces of data that would require executing multiple requests.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
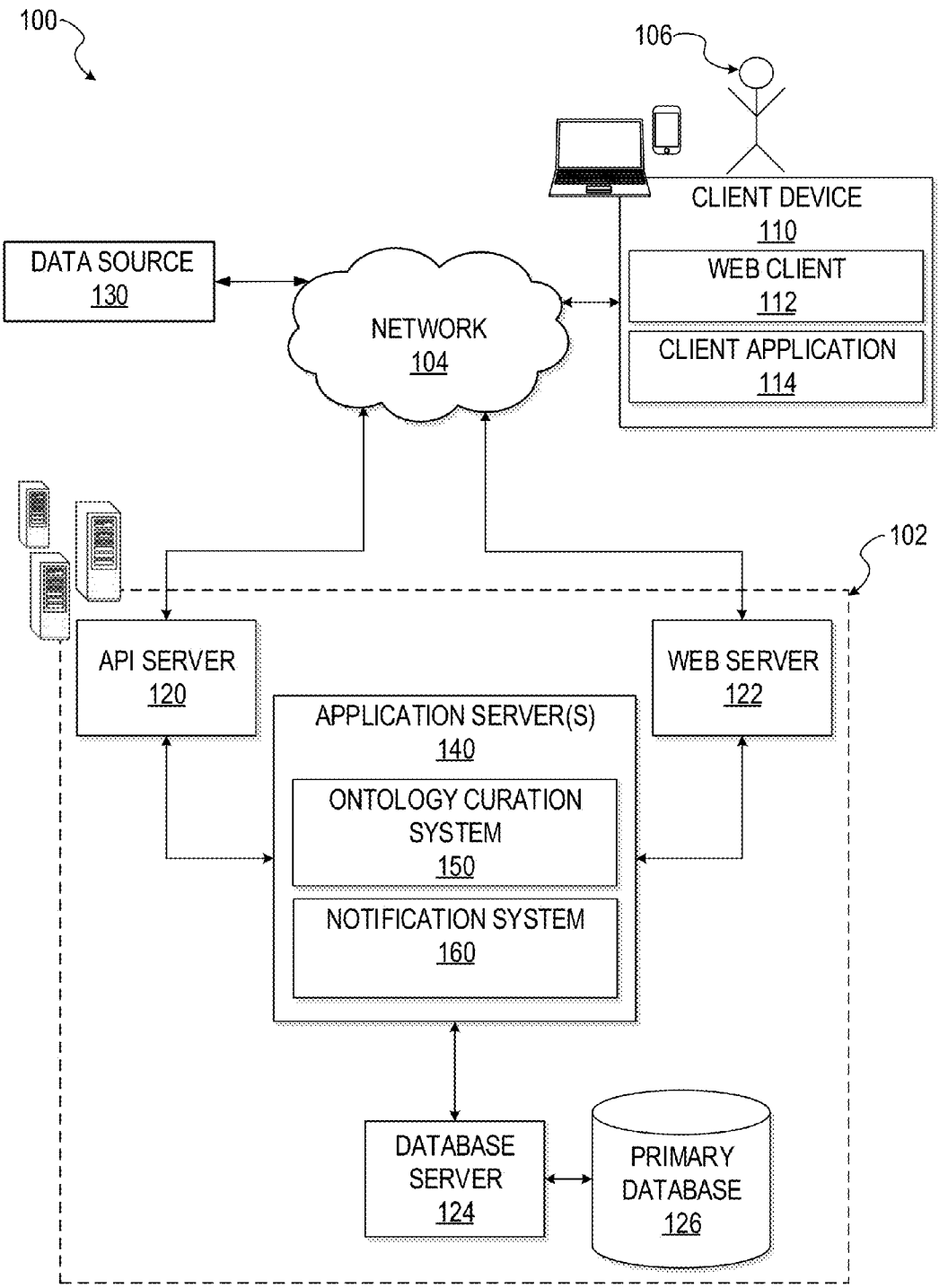
FIG. 1 is a network diagram depicting a network system comprising a group of application servers in communication with a network-based ontology curation system configured for managing and curating large-scale data sets, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a notification system that provides users with notifications with respect to data objects and/or components of data objects (e.g., properties, media, links, notes, etc.). The notification system presents a notification interface that enables a user to register to monitor data objects and/or specific object components for modifications. Once a user has registered to monitor a data object and/or components of the data object, the notification system can periodically transmit requests for the data and determines whether the data has been modified. The notification system can provide the user with a notification when a modification to the selected data has occurred.

The notification system can be configured to work with any type of system, such as any type of database system. For example, in some embodiments, the notification system can be utilized to monitor changes to data objects maintained by an ontology curation system.

Computer-based database systems, such as relational database management systems, typically organize data according to a fixed structure of tables and relationships. The structure may be described using an ontology, embodied in a database schema, comprising a data model that represents the structure and reason about objects in the structure. As discussed above, an ontology is normally fixed at the time that the database is created such that any change to the ontology represented by the schema is extremely disruptive to the database system, and may require user intervention by an administrator to modify tables or relationships, or to create new tables or relationships. Thus, a system to curate ontologies may be configured to minimize changes to data by the ontology curation system.

In order to surface and present relevant data to the requesting users, the ontology curation system receives requests to view data objects, and curates ontologies of linked data associated with the data object of the request based on attributes of the request itself. In this way, the most relevant aspects of the requested data object may be presented to requesting users.

As an example, the request attributes may include a reference to a data object, or component of a data object, an identifier of the requesting device itself, as well as user attributes of a user making the request (e.g., user profile data). In response to receiving the request, the network-based ontology curation system identifies properties of the requested data object and accesses one or more databases to gather a set of data objects to include in a curated ontology associated with the data object for the requesting user. The one or more databases can include databases maintained by the network-based ontology curation system as well as federated data source databases. A federated data source can be any service external to the network-based ontology curation system that exposes read functionality (e.g., search, aggregation, object load) for data maintained by the federated data source.

The network-based ontology curation system retrieves and prioritizes data objects from the databases (e.g., databases maintained by the network-based ontology curation system and/or federated data source databases) based on the request attributes, and generates a curated ontology based on the prioritization. For example, the system may prioritize what to show and the placement of the various data objects. Separately, the underlying components for searching and applying an ontology may prioritize amongst the various data sources and/or the data from a given data source (e.g., for example, if there are duplicates, older or newer entries). In some example embodiments, the network-based ontology curation system generates and causes display of a view of the data object based on the curated ontology at a graphical user interface (GUI) at the requesting device. A format of the presentation may also be based on the request attributes.

The ontology curation system retrieves the set of data objects from a primary database maintained by the network-based ontology curation system. In one embodiment, the primary database may include identifiers, e.g., keys, pointers, addresses, or row numbers, usable to access data objects within one or more federated data source databases. An identifier may uniquely identify data in a federated data source database. In other words, the identifier in the primary database refers to data stored in the federated database.

In some example embodiments, the ontology curation system may simply be configured based on user inputs defining priorities of data objects based on request attributes. For example, the ontology curation system may receive a configuration specifying priorities, and present formats of ontologies based on requests attributes. Request attributes may include device identifiers, device attributes of the requesting device (e.g., mobile, desktop, wearable, etc.) organization identifiers, user identifiers, as well as team identifiers of specific teams within organizations (e.g., marketing, security, sales).

A notification system provides users with notifications with respect to data objects and/or components of data objects (e.g., properties, media, links, notes, etc.). The notification system presents a notification interface that enables a user to register to monitor data objects and/or specific object components for modifications. Once a user has registered to monitor a data object and/or components of the data object, the notification system can periodically transmit requests to the ontology curation system for the data and determines whether the data has been modified. The notification system can provide the user with a notification when a modification to the selected data has occurred.

FIG. 1 is a network diagram illustrating a network environment 100 suitable for operating an ontology curation system 150 along with a notification system 160. A networked system 102 provides server-side functionality, via a network 104 (e.g., an intranet, the Internet or a Wide Area Network (WAN)), to one or more clients such as the client device 110. FIG. 1 illustrates a web client 112 and client application 114 executing on client device 110.

An Application Program Interface (API) server 120 and a web server 122 are coupled to, and provide programmatic and web interfaces respectively to, application server(s) 140. The application server(s) 140 host the ontology curation system 150 and the notification system 160. The application server(s) 140 are coupled to database server 124 that facilitates access to the primary database 126. The primary database 126 may include one or more databases.

Although the application server(s) 140 are shown as a single component, this is only for ease of explanation and not meant to be limiting. One skilled in the art would recognize that the application server(s) 140 can be comprised of one or more computing devices, and that the ontology curation system 150 and the notification system 160 can reside on different application servers 140. Further, while the networked system 102 is shown as including only a single ontology curation system 150 and notification system 160, this too is only for ease of explanation and not meant to be limiting. The networked system 102 can include multiple ontology curation systems 150 and/or notification systems 160, and this disclosure anticipates all such embodiments. For example, in some embodiments, the notification system 160 can be configured to communicate and monitor data maintained by multiple ontology curation systems 150. In this way, the notification system 160 can be a central repository for user notifications across multiple ontology curation systems 150 that a user desires to monitor. Further, although the functionality of the notification system 160 is discussed in relation to an ontology curation system 150, this is also just one example and not meant to be limiting. The notification system 160 can be configured to monitor any type of system, such as a general database system, and provide a user with notifications. This disclosure anticipates any and all such embodiments discussed above.

The ontology curation system 150 curates ontologies based on input data and request attributes from requests received from client devices (e.g., client device 110) and/or notification system 160. For example, the ontology curation system 150 is configured to receive requests to access or view data objects, access the primary database 126 and/or data source 130 to retrieve a set of data objects based on request attributes of the request, curate an ontology based on the set of data objects, and return the curated data in response to the request. Although a single data source is shown, this is for ease of explanation and not meant to be limiting. One skilled in the art would recognize that network environment 100 can include any number of data sources, and this disclosure anticipates all such variations.

The notification system 160 provide users with notifications with respect to data objects and/or components of data objects (e.g., properties, media, links, notes, etc.). The notification system 160 presents a notification interface that enables a user to select data objects and/or specific object components that the user would like to monitor. Once a user has registered to monitor data objects, the notification system 160 periodically transmits requests to the ontology curation system 150 for the data objects and determines whether the data object (e.g., object components of the data object) have been modified. The notification system 160 can provide the user with a notification when a modification to the selected data object has occurred.

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the networked system 102 to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with the web client 112 (e.g., a browser) or the client application 114, executing on the client device 110, and in communication with the networked system 102.

Figure 2:
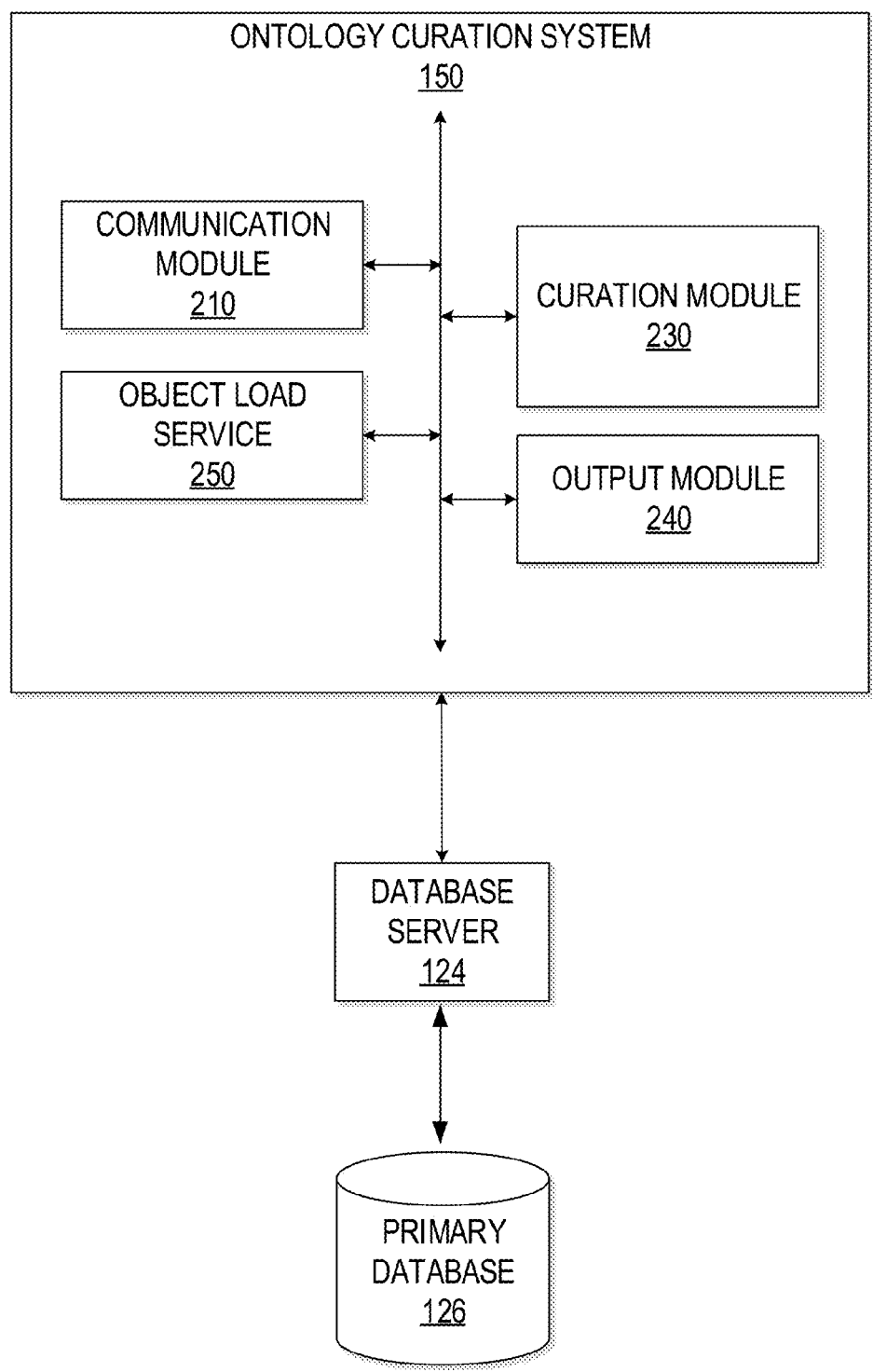
FIG. 2 is a block diagram illustrating various components of the ontology curation system, which is provided as part of the network system, consistent with some embodiments.

FIG. 2 is a block diagram illustrating various components of the ontology curation system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the ontology curation system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the ontology curation system 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The ontology curation system 150 is shown as including a communication module 210, a curation module 230, an output module 240, and an object load service 250, all configured to communicate with each other and the primary database 126 (e.g., via a bus, shared memory, a switch, or application programming interfaces (APIs)). The primary database 126 may comprise one or more databases. In some example embodiments, the primary database 126 is organized in an ontology and/or object model. The data source 130 may be organized in any data structure or data store for storing and/or organizing data, including but not limited to, relational databases, object-oriented databases, key-value stores and/or XML databases among others. In some example embodiments, the data source 130 may contain high-scale datasets including time series data, however the data source 130 may contain any type of data.

In some example embodiments, the application server 140 transmits requests to the ontology curation system 150, which in turn sends the request along to the database server 124. The database server 124 may then query the primary database 126. In such embodiments, the primary database 126 may employ an ontology schema and return search results based on the request received from the database server 124. The search results may for example include data objects, e.g., a string (e.g., text string) or JSON data object.

In further embodiments, the ontology curation system 150 may include a translation layer (e.g., Object Load Service 250) configured to intercept returned queries from the primary database 126 to add type, change a type, or to otherwise vary the returned query based on the custom ontology. For example, the object load service 250 may be configured to enrich the returned search results with data retrieved from another data source, such as the data source 130. The data source 130 can maintain any type of data, such as high-scale time series data. High-scale data sets can include an IP geocoding service that includes data useable to enrich data objects (e.g., IP addresses) received from the primary database 126 with latitude/longitude coordinates; as well as a map tile database that contains map imagery depicting locations of coordinates.

In some example embodiments, the primary database 126 returns a data object in response to receiving the request from the ontology curation system 150, wherein the data object is a JSON data object that contains an identifier. The ontology curation system 150 receives the JSON object and queries the data sources 130 using the identifier in the JSON data object as a query.

The communication module 210 provides functionality to communicate with client device 110 in order to receive requests to view data objects. The requests may include a reference to a data object or a component of a data object, as well as attributes and properties of the client device 110, and the requesting user 106. The communication module 210 also provides functionality to receive requests for data from notification system 160. The requests may include a reference to a data object or a component of a data object, as well as attributes and properties of the client device 110, and the requesting user 106.

Object components of a data object may include object properties, object media, object notes, and object links. The object properties are structured pieces of information that define behavior and characteristics of the data object (e.g., a data type). The object media include binary attachments of data that may include images, text, video, and other specialized forms. The object notes are free text containers of information that provide details about the data object itself. The object links define connections of any one data object to one or more linked data objects. Data objects may also include metadata that defines geo-coordinates (e.g., to indicate a source location of the data object), as well as temporal data (e.g., defining a point in time in which the data object was collected).

In some example embodiments, the data objects may further include an Access Control List (ACL), which is a list of Access Control Items (ACIs). Each ACI defines a level of permission that a particular user or user group is permitted to the data object and/or components of the data object. An ACL includes a set of these permissions.

The output module 240 returns requested data objects in response to a received request. For example, the output module 240 can provide requested data objects and/or object components to the notification system 160 and or the client device 110.

The output module 240 can generate and cause display of a presentation of the data object based on the curated ontology at the client device 110. The presentation may be generated based on: the type of data to include in an object view; pre-configured presentation requirements associated with data types; as well as access credentials of a requesting user. For example, some users may have greater access privileges than other users, such that some data may not be viewable. In some example embodiments, the presentation of the data object is based on request attributes that include one or more device properties of the requesting client device 110. For example, the presentation of the data object may differ based on the client device 110 being a mobile device versus a desktop device, as both devices would receive different curated ontologies.

In some example embodiments, the output module 240 also determines a presentation format of each linked data object in the curated ontology based on corresponding object components. For example, a first data object may include object components indicating that the first data object can be displayed in a map image, while a second data object includes object components that indicate that the second data object must be displayed in a time series. The output module 240 formats the presentation of the curated ontology based on the object components.

FIG. 2 also includes a depiction of primary database 126. In some example embodiments, the primary database 126 may receive data (e.g., high-scale data sets) from a data source 130.

Figure 3:
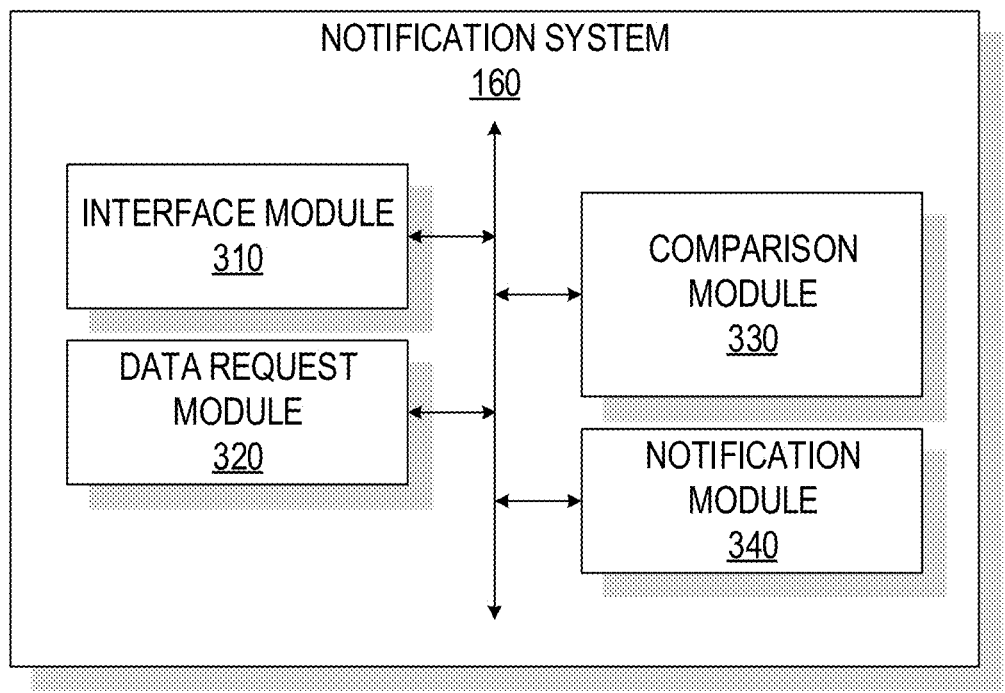
FIG. 3 is a block diagram illustrating various components of the notification system, which is provided as part of the networked system 102, consistent with some embodiments.

FIG. 3 is a block diagram illustrating various components of the notification system 160, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 3. However, a skilled artisan will readily recognize that various additional functional components may be supported by the notification system 160 to facilitate additional functionality that is not specifically described herein.

As is understood by skilled artisans in the relevant computer arts, each functional component (e.g., module) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 3 may reside on a single computer (e.g., a laptop), or may be distributed across several computers in various arrangements such as cloud-based architectures. Moreover, any two or more modules of the notification system 160 may be combined into a single module, or subdivided among multiple modules. It shall be appreciated that while the functional components (e.g., modules) of FIG. 3 are discussed in the singular sense, in other embodiments, multiple instances of one or more of the modules may be employed.

The notification system 160 is shown as including an interface module 310, a data request module 320, a comparison module 330 and a notification module 340, all configured to communicate with each other and the database 126 (e.g., via a bus, shared memory, a switch, or application programming interfaces (APIs)).

The interface module 310 can provide a user with a notification interface that enables the user to register to monitor data objects for modifications. Monitoring a data object for modifications can include monitoring the data object as a whole for modifications, including modifications made to any components of the data object and/or data objects linked to the data object. Alternatively, monitoring a data objects for modifications can include monitoring a subset of the data object for modifications, such as modifications to specified components of the data object and/or data objects linked to the data object. A modification can include any change to data, such as an addition of data, deletion of data and/or modification of existing data.

The notification interface can present a listing of various data objects that the user can register to monitor. This can include data objects associated with different services, data objects including components that are stored at different databases and/or data sources, etc. The user can browse the listed data objects and register to monitor one or more of the data objects. For example, the notification interface can include one or more user interface elements, such as buttons, text boxes, links, checkboxes, etc., that the user can interact with to register to monitor selected data objects.

In some embodiments, the notification interface can present the user with data identifying the components of the data objects and/or data objects linked to the data objects. In this type of embodiment, the user can register to monitor a data object as a whole or, alternatively, register for a subset of components of the data object.

In some embodiments, the notification interface can allow the user to select notification settings dictating how the user would like the data objects monitored and/or how the user would like to be notified that a data object has been modified. For example, the notification interface can allow the user to select a monitoring frequency at which the user would like the data objects monitored for modifications, such as every 30 seconds, 1 minute, 10 minutes, 1 hour, 24 hours, etc. The notification interface can allow the user to select an overall monitoring frequency for monitoring all registered data objects and/or select individual monitoring frequencies for one or more of the registered data objects. Accordingly, a user could select a different monitoring frequency for each registered data object.

In some embodiments, the notification interface can allow a user to select a monitoring duration for a data object. The monitoring duration can indicate a period of time during which the notification system 160 will monitor the selected data objects for modifications. The notification system 160 stops monitoring the data object after the selected monitoring duration has expired.

In some embodiments, the notification interface can allow the user to select how the user would like to be notified that a modification to a data object has occurred. For example, the notification interface can allow the user to select a preferred contact method, such as e-mail, push notification, phone call, etc. The notification interface can also allow the user to select times when the user would like to be notified and/or notification methods based on time. For example, a user may choose to only receive notifications during working hours (e.g., 9 am-5 pm). Alternatively, a user may choose to receive push notifications during working hours and e-mails after working hours.

The interface module 310 can save the user's selections in a notification settings file associated with the user. For example, the notification settings file can be stored in the database 126 and the interface module 310 can communicate with the database 126 to modify the notification settings file according to a user's selections. The notification settings file can include data identifying the data objects the user has registered to monitor, monitoring frequencies, monitoring durations, preferred contact methods, selected notification times, etc. The notification settings file can also include data identifying the user and/or the user's client device 110.

The data request module 320 can utilize a user's notification setting file to generate and transmit requests to the ontology curation system 150 for data objects and/or components of data objects that the user has registered to monitor. For example, the data request module 320 can utilize the user's notification setting file to generate a request including request attributes identifying the data objects and/or components of data objects that the user has registered to monitor.

The data request module 320 can also include data identifying the user and/or the user's client device 110 in the request, which the ontology curation system 150 can utilize to confirm that the user has permission to access the requested data objects. For example, the ontology curation system 150 can utilize the data identifying the user and/or the user's client device to check an ACL associated with a requested component and confirm that the user has permission to access the component. The ontology curation system 150 will not return requested data if the user does not have permission to access the requested data.

The data request module 320 can generate and transmit requests to the ontology curation system 150 based on the monitoring frequencies included in the user's notification setting. Alternatively, the data request module 320 can generate and transmit the requests according to a predetermined schedule.

The data request module 320 can provide the data received from the ontology curation system 150 to the comparison module 330. The comparison module 330 can utilize the received data to determine whether any modifications have occurred. In some embodiments, the comparison module 330 can compare the received data (e.g., components of a data object) to a previously received version of the data. The previously received version of the data can be stored in the database 126 and the comparison module 330 can communicate with the database to access the previously received version of the data. If the comparison module 330 determines that the data includes a modification from the previously received version of the data, the comparison module 330 can alert the notification module 340 of the detected modification. The comparison module 330 can also update the previously received version of the data stored in the database to reflect the modification.

The notification module 340 can notify the user that a modification to a data object has been detected. For example, the notification module 340 can send the user an e-mail, send a push notification to the user's client device 110, call the user, etc. In some embodiments, the notification module 340 can notify the user based on the user's notification settings file. For example, the notification module 340 can access the user's notification settings file from the database to identify the user's preferred contact method and/or contact times. The notification module 340 can then notify the user according to the user's selected settings.

The notification can include any type of data notifying the user that the data object has been modified. For example, the notification can simply state that a data object has been modified. Alternatively, the notification can include detailed information about the modification, as well as links to access additional data, such as the modified data. User activity and interaction with the embedded links can be captured and analyzed as metrics to gauge performance and/or to modify future notifications.

In some embodiments, the notifications can be customized by the user. For example the user can select the type of data that the user would like to receive as part of the notification. In some embodiments, the notification interface can provide a user with one or more template notifications to select from as well as allow the user to customize the notifications by selecting data that the user would like included in the notification.

In some embodiments, the notification system 160 may transmit additional requests to the ontology curation system 150 when generating a notification. For example, the notification system 160 can query the ontology curation system 150 for additional data regarding data objects that have been modified. The notification system 160 can include the returned data in the notifications provided to the user.

Figure 4:
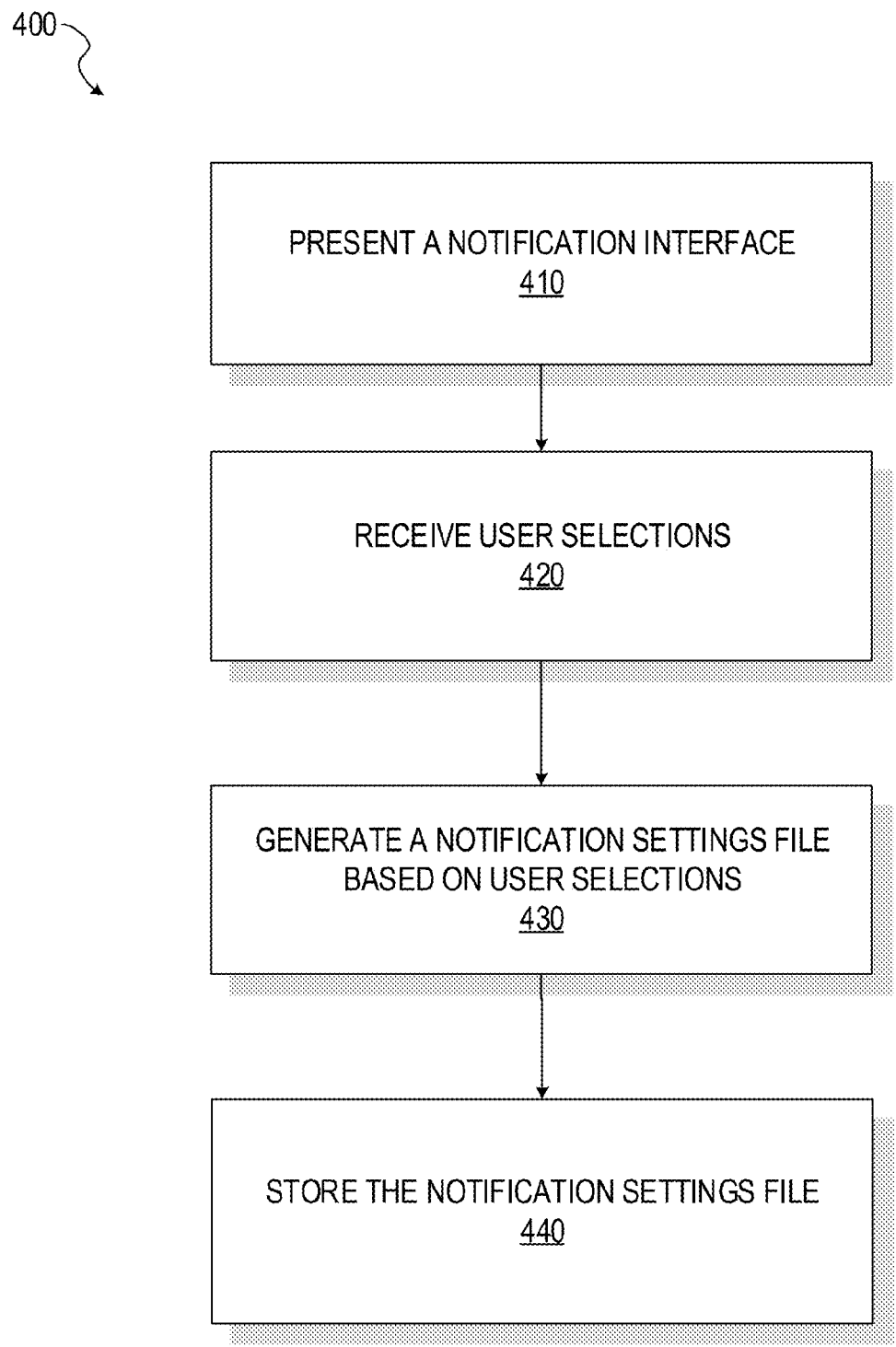
FIG. 4 is a flowchart illustrating a method for registering to monitor a data object, consistent with some embodiments.

FIG. 4 is a flowchart illustrating a method 400 for registering to monitor a data object, consistent with some embodiments. The method 400 is embodied in computer-readable instructions for execution by one or more processors such that the operations of the method 400 are performed in part or in whole by the notification system 160; accordingly, the method 400 is described below by way of example with reference thereto. However, it shall be appreciated that at least some of the operations of the method 400 may be deployed on various other hardware configurations, and the method 400 is not intended to be limited to the notification system 160.

At operation 410, the interface module 310 presents a notification interface. For example, the notification interface can be presented on a user's client device 110. The notification interface enables the user to register to monitor data objects for modifications. Monitoring a data object for modifications can include monitoring the data object as a whole for modifications, including modifications made to any components of the data object and/or data objects linked to the data object. Alternatively, monitoring a data objects for modifications can include monitoring a subset of the data object for modifications, such as modifications to specified components of the data object and/or data objects linked to the data object. A modification can include any change to data, such as an addition of data, deletion of data and/or modification of existing data.

The notification interface can present a listing of various data objects that the user can register to monitor. This can include data objects associated with different services, data objects including components that are stored at different databases and/or data sources, etc. The user can user the notification interface to browse the listed data objects and register to monitor one or more of the data objects. For example, the notification interface can include one or more user interface elements, such as buttons, text boxes, links, checkboxes, etc., that the user can interact with to register to monitor selected data objects.

In some embodiments, the notification interface can present the user with data identifying the components of the data objects and/or data objects linked to the data objects. In this type of embodiment, the user can register to monitor a data object as a whole or, alternatively, register for a subset of components of the data object.

In some embodiments, the notification interface can allow the user to select notification settings dictating how the user would like the data objects monitored and/or how the user would like to be notified that a data object has been modified. For example, the notification interface can allow the user to select a monitoring frequency at which the user would like the data objects monitored for modifications, such as every 30 seconds, 1 minute, 10 minutes, 1 hour, 24 hours, etc. The notification interface can allow the user to select an overall monitoring frequency for monitoring all registered data objects and/or select individual monitoring frequencies for one or more of the registered data objects. Accordingly, a user could select a different monitoring frequency for each registered data object.

In some embodiments, the notification interface can allow a user to select a monitoring duration for a data object. The monitoring duration can indicate a period of time during which the notification system 160 will monitor the selected data objects for modifications. The notification system 160 stops monitoring the data object after the selected monitoring duration has expired.

In some embodiments, the notification interface can allow the user to select how the user would like to be notified that a modification to a data object has occurred. For example, the notification interface can allow the user to select a preferred contact method, such as e-mail, push notification, phone call, etc. The notification interface can also allow the user to select times when the user would like to be notified and/or notification methods based on time. For example, a user may choose to only receive notifications during working hours (e.g., 9 am-5 pm). Alternatively, a user may choose to receive push notifications during working hours and e-mails after working hours.

In some embodiments, the notification interface can allow the user to customize the notifications that the user receives. For example, the notification interface can provide the user with one or more template notifications that the user can select from. The notification interface can also allow the user to customize a selected template notification to further customize the notification to the user's specific needs.

At operation 420, the interface module 310 receives user selections indicating data object that the user would like to monitor as well as notification settings selected by the user. The user selections can be received as a result of the user utilizing the notification interface.

At operation 430, the interface module 310 generated a notification setting file based on the received user selections. The notification settings file can include data identifying the data objects the user has registered to monitor, monitoring frequencies, monitoring durations, preferred contact methods, selected notification times, etc. The notification settings file can also include data identifying the user and/or the user's client device 110.

At operation 440, the interface module 310 can store the notification settings file. For example, the notifications settings file can be stored in database 126.

Figure 5:
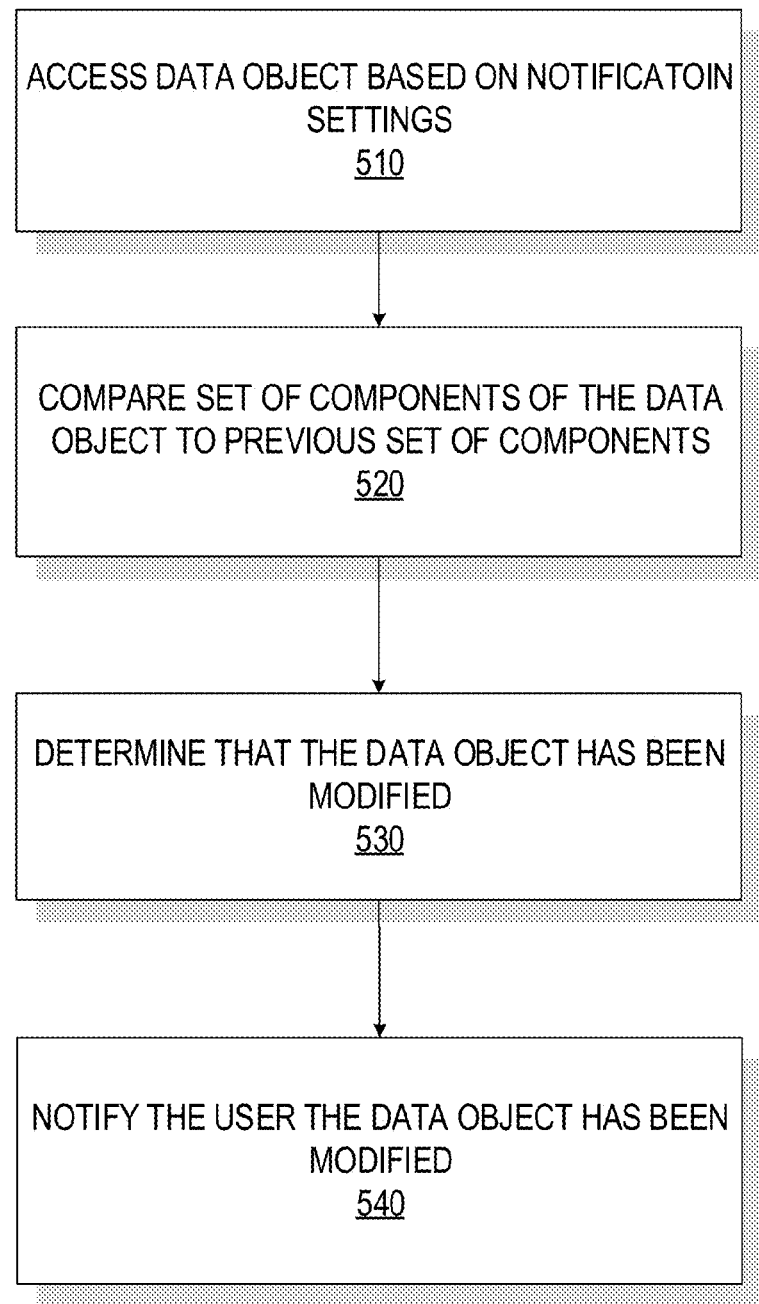
FIG. 5 is a flowchart illustrating monitoring a data object for changes, consistent with some embodiments.

FIG. 5 is a flowchart illustrating monitoring a data object for changes, consistent with some embodiments. The method 500 is embodied in computer-readable instructions for execution by one or more processors such that the operations of the method 500 are performed in part or in whole by the notification system 160; accordingly, the method 500 is described below by way of example with reference thereto. However, it shall be appreciated that at least some of the operations of the method 500 may be deployed on various other hardware configurations, and the method 500 is not intended to be limited to the notification system 160.

At operation 510, the data request module 320 accesses a data object based on a user's notification settings. The data request module 320 can utilize a user's notification setting file to generate and transmit a request to the ontology curation system 150 for the data object and/or components of data object that the user has registered to monitor. For example, the data request module 320 can utilize the user's notification setting file to generate a request including request attributes identifying the data object and/or components of data object that the user has registered to monitor.

The request can also include data identifying the user and/or the user's client device 110, which the ontology curation system 150 can utilize to confirm that the user has permission to access the requested data objects. For example, the ontology curation system 150 can utilize the data identifying the user and/or the user's client device to check an ACL associated with a requested component and confirm that the user has permission to access the component. The ontology curation system 150 may deny requests for data that the user does not have permission to access.

The data request module 320 can generate and transmit the request according to the monitoring frequencies included in the user's notification setting. Alternatively, the data request module 320 can generate and transmit the requests according to a predetermined schedule.

The data request module 320 can provide the data received from the ontology curation system 150 to the comparison module 330. The received data can include data gathered from multiple data sources and/or databases.

At operation 520, the comparison module 320 compares the data object and/or set of components of the data object received in response to the request to a previous set of components of the data object. The previous set of components can be a set of components that were previously received and recorded by the notification system 160. The previous set of the data object can be stored in the database 126 and the comparison module 330 can communicate with the database to access the previously received version of the data. The comparison module 320 can compare perform the comparison to determine whether the data object has been modified (e.g., one or more components of the data object have been modified).

At operation 530, the comparison module determines, based on the comparison, that the set of components of the data object includes at least one modification from the previous set of components of the data object.

At operation 540, the notification module 340 notifies the user of the at least one modification to the data object. For example, the notification module 340 can send the user an e-mail, send a push notification to the user's client device 110, call the user, etc. In some embodiments, the notification module 340 can notify the user based on the user's notification settings file. For example, the notification module 340 can access the user's notification settings file from the database 126 to identify the user's preferred contact method and/or contact times. The notification module 340 can then notify the user according to the user's selected settings.

The notification can include any type of data notifying the user that the data object has been modified. For example, the notification can simply state that the data object has been modified. Alternatively, the notification can include detailed information about the modification, as well as links to access the modified data.

Figure 6:
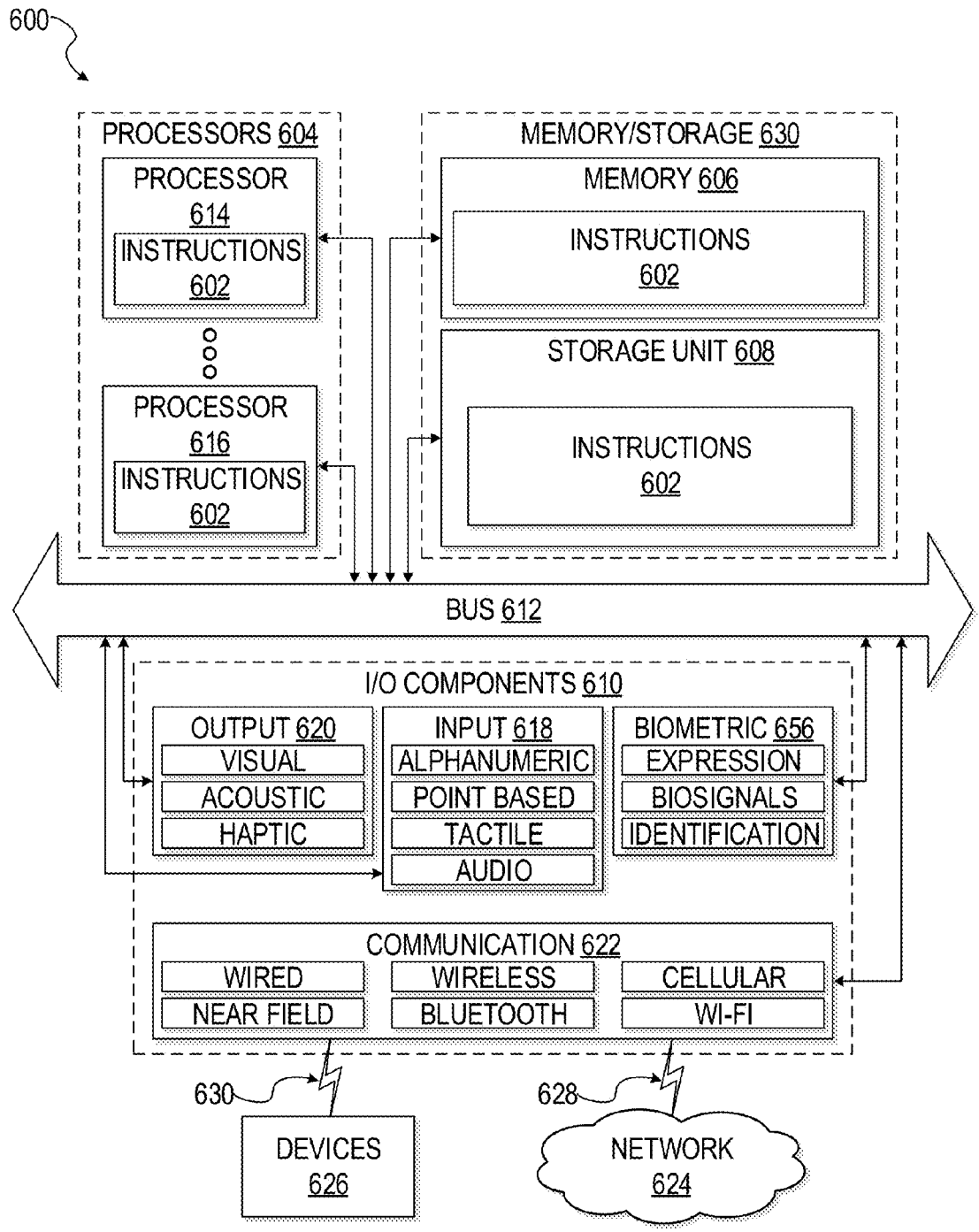
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system within which a set of instructions for causing the machine to perform any one or more of the methodologies discussed herein may be executed. Specifically, FIG. 6 shows a diagrammatic representation of the machine 600 in the example form of a system, within which instructions 602 (e.g., software, a program, an application, an applet, an app, a driver, or other executable code) for causing the machine 600 to perform any one or more of the methodologies discussed herein may be executed. For example, the instructions 602 include executable code that causes the machine 600 to execute the methods 400 and 500. In this way, these instructions 602 transform the general, non-programmed machine into a particular machine programmed to carry out the described and illustrated functions in the manner described herein. The machine 600 may operate as a standalone device or may be coupled (e.g., networked) to other machines.

By way of non-limiting example, the machine 600 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 602, sequentially or otherwise, that specify actions to be taken by machine 600. Further, while only a single machine 600 is illustrated, the term "machine" shall also be taken to include a collection of machines 600 that individually or jointly execute the instructions 602 to perform any one or more of the methodologies discussed herein.

The machine 600 may include processors 604, memory 606, storage unit 608 and I/O components 610, which may be configured to communicate with each other such as via a bus 612. In an example embodiment, the processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 614 and processor 616 that may execute instructions 602. The term "processor" is intended to include multi-core processors that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 (e.g., a main memory or other memory storage) and the storage unit 608 are both accessible to the processors 604 such as via the bus 612. The memory 606 and the storage unit 608 store the instructions 602 embodying any one or more of the methodologies or functions described herein. In some embodiments, the database 126 resides on the storage unit 608. The instructions 602 may also reside, completely or partially, within the memory 606, within the storage unit 608, within at least one of the processors 604 (e.g., within the processor's cache memory), or any suitable combination thereof, during execution thereof by the machine 600. Accordingly, the memory 606, the storage unit 608, and the memory of processors 604 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 602. The term "machine-readable medium" shall also be taken to include any medium, or combination of multiple media, that is capable of storing instructions (e.g., instructions 602) for execution by a machine (e.g., machine 600), such that the instructions, when executed by one or more processors of the machine 600 (e.g., processors 604), cause the machine 600 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine will depend on the type of machine. For example, portable machines such as mobile phones will likely include a touch input device or other such input mechanisms, while a headless server machine will likely not include such a touch input device. It will be appreciated that the I/O components 610 may include many other components that are not specifically shown in FIG. 6. The I/O components 610 are grouped according to functionality merely for simplifying the following discussion and the grouping is in no way limiting. In various example embodiments, the I/O components 610 may include input components 618 and output components 620. The input components 618 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 610 may include communication components 622 operable to couple the machine 600 to a network 624 or devices 626 via coupling 628 and coupling 630, respectively. For example, the communication components 622 may include a network interface component or other suitable device to interface with the network 624. In further examples, communication components 622 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 626 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more computer processors of a machine; and
   one or more computer-readable mediums storing instructions that, when executed by the one or more computer processors, cause the machine to perform operations comprising:
   identifying a first data object that a user has registered to monitor for changes;
   accessing, from a first database, a set of identifiers corresponding to the first data object, the set of identifiers identifying locations of a set of components of the first data objects;
   accessing, based on the set of identifiers, the set of components of the first data object, the set of components accessed from at least a second database, different than the first database;
   comparing the set of components of the first data object to a previous set of components of the first data object, yielding a comparison;
   determining, based on the comparison, that the set of components of the first data object includes at least one modification from the previous set of components of the first data object; and
   in response to determining that the set of components of the first data object includes at least one modification from the previous set of components of the first data object, notifying the user of the at least one modification to the first data object, the user being registered to monitor the first data object for modifications.

2. The system of claim 1, the operations further comprising:
   accessing a set of components for a second data object, the user having registered to monitor the second data object for modifications, the second data object being different than the first data object;
   comparing the set of components of the second data object to a previous set of components of the second data object, yielding a second comparison;
   determining, based on the second comparison, that the set of components of the second data object includes at least one modification from the previous set of components of the first data object; and
   in response to determining that the set of components of the second data object includes at least one modification from the previous set of components of the second data object, notifying a user of the at least one modification to the second data object.

3. The system of claim 1, wherein the set of components of the first data object includes at least one of properties, media, notes or links.

4. The system of claim 1, wherein accessing the set of components of the first data object comprises:
   accessing an access control list (ACL) associated with a first component from the set of components; and
   determining, based on the ACL associated with the first component, that the user is authorized to access the first component.

5. The system of claim 1, wherein notifying the user of the at least one modification to the first data object comprises:
   transmitting a message to a client device of the user, the message being presentable on a display of the client device and including data indicating that the first data object has been modified.

6. The system of claim 1, the operations further comprising:
   presenting, on a client device of the user, a notification interface including one or more data objects that the user can register to monitor for modifications; and receiving, from the client device, an input indicating that the user has registered to monitor the first data object for modifications.

7. The system of claim 1, wherein accessing the set of components of the first data object comprises:
retrieving, from a first data source, a first component from the set of component of the first data object; and
retrieving, from a second data source, a second component form the set of components of the first data object.

8. A method comprising:
identifying a first data object that a user has registered to monitor for changes;
accessing, from a first database, a set of identifiers corresponding to the first data object, the set of identifiers identifying locations of a set of components of the first data objects;
accessing, based on the set of identifiers, the set of components of the first data object, the set of components accessed from at least a second database, different than the first database;
comparing the set of components of the first data object to a previous set of components of the first data object, yielding a comparison;
determining, based on the comparison, that the set of components of the first data object includes at least one modification from the previous set of components of the first data object; and
in response to determining that the set of components of the first data object includes at least one modification from the previous set of components of the first data object, notifying the user of the at least one modification to the first data object, the user being registered to monitor the first data object for modifications, wherein the method is performed by one or more computer processors.

9. The method of claim 8, further comprising:
accessing a set of components for a second data object, the user having registered to monitor the second data object for modifications, the second data object being different than the first data object;
comparing the set of components of the second data object to a previous set of components of the second data object, yielding a second comparison;
determining, based on the second comparison, that the set of components of the second data object includes at least one modification from the previous set of components of the first data object; and
in response to determining that the set of components of the second data object includes at least one modification from the previous set of components of the second data object, notifying the user of the at least one modification to the second data object.

10. The method of claim 8, wherein the set of components of the first data object includes at least one of properties, media, notes or links.

11. The method of claim 8, wherein accessing the set of components of the first data object comprises:
accessing an access control list (ACL) associated with a first component from the set of components; and
determining, based on the ACL associated with the first component, that the user is authorized to access the first component.

12. The method of claim 8, wherein notifying the user of the at least one modification to the first data object comprises:
transmitting a message to a client device of the user, the message being presentable on a display of the client device and including data indicating that the first data object has been modified.

13. The method of claim 8, further comprising:
presenting, on a client device of the user, a notification interface including one or more data objects that the user can register to monitor for modifications; and
receiving, from the client device, an input indicating that the user has registered to monitor the first data object for modifications.

14. The method of claim 8, wherein accessing the set of components of the first data object comprises:
retrieving, from a first data source, a first component from the set of component of the first data object; and
retrieving, from a second data source, a second component form the set of components of the first data object.

15. A non-transitory computer-readable medium storing instructions that, when executed by one or more computer processors of a machine, cause the machine to perform operations comprising:
identifying a first data object that a user has registered to monitor for changes;
accessing, from a first database, a set of identifiers corresponding to the first data object, the set of identifiers identifying locations of a set of components of the first data objects;
accessing, based on the set of identifiers, the set of components of the first data object, the set of components accessed from at least a second database, different than the first database;
comparing the set of components of the first data object to a previous set of components of the first data object, yielding a comparison;
determining, based on the comparison, that the set of components of the first data object includes at least one modification from the previous set of components of the first data object; and
in response to determining that the set of components of the first data object includes at least one modification from the previous set of components of the first data object, notifying the user of the at least one modification to the first data object, the user being registered to monitor the first data object for modifications.

16. The non-transitory computer-readable medium of claim 15, the operations further comprising:
accessing a set of components for a second data object, the user having registered to monitor the second data object for modifications, the second data object being different than the first data object;
comparing the set of components of the second data object to a previous set of components of the second data object, yielding a second comparison;
determining, based on the second comparison, that the set of components of the second data object includes at least one modification from the previous set of components of the first data object; and
in response to determining that the set of components of the second data object includes at least one modification from the previous set of components of the second data object, notifying the user of the at least one modification to the second data object.

17. The non-transitory computer-readable medium of claim 15, wherein the set of components of the first data object includes at least one of properties, media, notes or links.

18. The non-transitory computer-readable medium of claim 15, wherein accessing the set of components of the first data object comprises:
- accessing an access control list (ACL) associated with a first component from the set of components; and
- determining, based on the ACL associated with the first component, that the user is authorized to access the first component.

19. The non-transitory computer-readable medium of claim 15, wherein notifying the user of the at least one modification to the first data object comprises:
- transmitting a message to a client device of the user, the message being presentable on a display of the client device and including data indicating that the first data object has been modified.

20. The non-transitory computer-readable medium of claim 15, the operations further comprising:
- presenting, on a client device of the user, a notification interface including one or more data objects that the user can register to monitor for modifications; and
- receiving, from the client device, an input indicating that the user has registered to monitor the first data object for modifications.

* * * * *